(12) United States Patent
Varkey et al.

(10) Patent No.: US 11,268,329 B2
(45) Date of Patent: Mar. 8, 2022

(54) ELECTRICALLY CONDUCTIVE FIBER OPTIC SLICKLINE FOR COILED TUBING OPERATIONS

(71) Applicant: Schlumberger Technology Corporation, Sugar Land, TX (US)

(72) Inventors: Joseph Varkey, Sugar Land, TX (US); David Kim, Stafford, TX (US); Maria Grisanti, Missouri City, TX (US); Montie W. Morrison, Richmond, TX (US); Burcu Unai Altintas, Richmond, TX (US); Sheng Chang, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 666 days.

(21) Appl. No.: 14/917,630

(22) PCT Filed: Sep. 13, 2013

(86) PCT No.: PCT/US2013/059779
§ 371 (c)(1),
(2) Date: Mar. 9, 2016

(87) PCT Pub. No.: WO2015/038150
PCT Pub. Date: Mar. 19, 2015

(65) Prior Publication Data
US 2016/0222736 A1    Aug. 4, 2016

(51) Int. Cl.
*E21B 17/00*     (2006.01)
*E21B 17/20*     (2006.01)
(Continued)

(52) U.S. Cl.
CPC .......... *E21B 17/003* (2013.01); *E21B 17/206* (2013.01); *G02B 6/443* (2013.01);
(Continued)

(58) Field of Classification Search
CPC ............................ E21B 17/003; E21B 17/006
See application file for complete search history.

(56) References Cited

U.S. PATENT DOCUMENTS 5,419,188 A    5/1995   Rademaker et al.
5,485,745 A    1/1996   Rademaker et al.
(Continued)

FOREIGN PATENT DOCUMENTS

RU    2238578 C1    10/2004
RU    126502 U1    3/2013
(Continued)

OTHER PUBLICATIONS

Office Action issued in Eurasian Patent Appl. No. 201690592 dated Apr. 18, 2017; 5 pages (with English translation).
(Continued)

*Primary Examiner* — Robert E Fuller
*Assistant Examiner* — Lamia Quaim
(74) *Attorney, Agent, or Firm* — Michael L. Flynn (57) ABSTRACT

A slickline that includes both electrically conductive and fiber optic capacity. The slickline includes a fiber optic thread or bundle of threads that may be surrounded by an electrically conductive member such as split half shells of copper elements. Further, these features may be disposed in a filler matrix so as to provide a cohesiveness the core of the slickline. So, for example, the line may be more effectively utilized in downhole applications such as coiled tubing operations, without undue concern over collapse or pinhole issues emerging in the line.

19 Claims, 6 Drawing Sheets (51) Int. Cl.
*G02B 6/44* (2006.01)
*G02B 6/50* (2006.01)
*H01B 9/00* (2006.01)

(52) U.S. Cl.
CPC ......... *G02B 6/4416* (2013.01); *G02B 6/4427* (2013.01); *G02B 6/4458* (2013.01); *G02B 6/4464* (2013.01); *G02B 6/502* (2013.01); *H01B 9/005* (2013.01); *G02B 6/50* (2013.01)

(56) References Cited

U.S. PATENT DOCUMENTS

| | | | |
|---|---|---|---|
| 5,495,547 A | 2/1996 | Rafie et al. | |
| 6,392,151 B1* | 5/2002 | Rafie | E21B 17/206 174/106 R |
| 6,600,108 B1* | 7/2003 | Mydur | H01B 7/046 174/120 R |
| 7,119,283 B1* | 10/2006 | Varkey | H01B 7/2806 174/102 R |
| 7,496,258 B1 | 2/2009 | Varkey | |
| 2005/0236161 A1 | 10/2005 | Gay et al. | |
| 2006/0045442 A1 | 3/2006 | Varkey et al. | |
| 2006/0280412 A1 | 12/2006 | Varkey | |
| 2008/0073077 A1* | 3/2008 | Tunc | E21B 23/14 166/250.01 |
| 2008/0289851 A1* | 11/2008 | Varkey | G02B 6/4416 174/115 |
| 2009/0046983 A1* | 2/2009 | Varkey | G02B 6/443 385/113 |
| 2009/0145610 A1* | 6/2009 | Varkey | E21B 17/206 166/335 |
| 2014/0367121 A1 | 12/2014 | Varkey et al. | |

FOREIGN PATENT DOCUMENTS

| | | |
|---|---|---|
| WO | 02099491 A1 | 12/2002 |
| WO | 2004046505 A2 | 6/2004 |
| WO | 2005103437 A1 | 11/2005 |
| WO | 2008027387 A2 | 3/2008 |
| WO | 2012071101 A1 | 5/2012 |
| WO | 2015038150 A1 | 3/2015 |

OTHER PUBLICATIONS

Examination report issued in European Patent Appl. No. 13893487.2 dated Aug. 4, 2017; 7 pages.
Search report issued in European Patent Appl. No. 13893487.2 dated Jul. 12, 2017; 5 pages.
International Search Report and the Written Opinion for International Application No. PCT/US2013/059779 dated Jul. 3, 2014.

* cited by examiner

ELECTRICALLY CONDUCTIVE FIBER OPTIC SLICKLINE FOR COILED TUBING OPERATIONS

BACKGROUND

Exploring, drilling and completing hydrocarbon and other wells are generally complicated, time consuming and ultimately very expensive endeavors. In recognition of these expenses, added emphasis has been placed on efficiencies associated with well completions and maintenance over the life of the well. Along these lines, added emphasis has been placed on well logging, profiling and monitoring of conditions from the outset of well operations. Whether during interventional applications or at any point throughout the life of a well, detecting and monitoring well conditions has become a more sophisticated and critical part of well operations.

Initial gathering of information relative to well and surrounding formation conditions may be obtained by way of a logging application. That is, equipment at the surface of an oilfield adjacent to the well may be used to deploy a logging tool in the well. Often, an electrically conductive logging cable is used to deliver the logging tool into the well. The logging cable may include a variety of power and communicative lines incorporated into the cable along with a host of isolating and protective polymer layers. As a result, the cable may be of relatively substantial weight, strength, and profile. Thus, the cable may be well suited for delivery of the logging tool to significant well depths without undue concern over the accommodated load of the tool or perhaps the increasing load of the cable itself.

While well suited to accommodate a significant amount of load, the use of such cables as described above means that the equipment positioned at the surface of the oilfield may be fairly substantial in terms of footprint and power requirements therefor. Similarly, the set up and performance cost of running the operation may also be quite significant.

Due to the costs involved, a cabled logging application as described above is often bypassed in favor of a more cost effective "slickline" logging application. That is, rather than employing an electrically powered and/or electrically communicative cable as in the case of a cabled application, a comparatively lower profile line without such capacity may be employed in a conventional slickline application. The slickline is a relatively unitary line used to deliver the logging tool which includes no electrically conductive wiring. Thus, a downhole battery is provided and data obtained from the logging application may be processed after retrieval of the logging tool. Notably, however, due to the substantially lower profile and comparatively lower weight of the slickline, considerable expense may be saved. For example, expenses may be affected in terms of reduced surface equipment requirements, as well as reductions in expenses associated with set up, powering, and footprint requirements.

It is also known to deploy a fiber optic tether into a wellbore, either directly or within coiled tubing, which enables the acquisition and transmission of real-time logging information to monitoring or analytical equipment at the surface of the oilfield. Indeed, such a fiber optic tether may be utilized in conjunction with a host of more interventional applications beyond logging. For example, a fiber optic tether may be of particular benefit when used in combination with coiled tubing applications. Specifically, the tether may be pumped through the coiled tubing at the outset of operations to provide real-time feedback regarding any subsequent applications that utilize the coiled tubing.

While adept at providing the benefits of a low-profile and lightweight means of data transmission, the fiber optic tether remains devoid of any electrically conductive capacity. That is, in contrast to the above noted wireline cable, the fiber optic tether is devoid of the heavier electrical cabling. While this is advantageous for reasons noted hereinabove, it means that reliance on a dedicated, space consuming, downhole power source is still required. Thus, the power available to monitoring equipment is limited to the constraints of such a power source.

In addition to the lack of a surface supported power supply, the fiber optic tether faces other added challenges. For example, this type of tether consists of one or more optical fibers or fiber optic threads as noted above, which are bundled and run through a protective metal tube. Thus, in addition to accommodating fiber optic threads, the tether inherently includes a fair amount of void space. The result is that the tether may be prone to collapse. Similarly, the slightest of pinholes into the metal tube during a downhole application may directly expose the threads to damaging downhole or application fluids.

The problems associated with power limitations and current construction of fiber optic tether do not lend to merely adding in another line. For example, inserting a separate electrical line into the metal tube might address the lack of surface available power. However, since a dedicated power line would not strategically occupy void space, such would only increase the overall diameter of the tether as well as the amount of void space. Indeed, when considering insulating and other layers of the electrical line, the tether may begin to take on dimensions and weight more characteristic of wireline. Thus, the advantage of utilizing the tether may begin to be lost.

At present, operators are generally left with the option of choosing between a lightweight fiber optic tether without electrically conductive capacity and a wireline cable that may be far heavier than is required for the job. Yet, due to the potential need for surface based power, the more cumbersome wireline is often the only practical conveyance option available.

SUMMARY

A fiber optic slickline is provided for use in a well. The slickline includes a fiber optic thread to provide communications through the well. Additionally, an electrically conductive member is provided about the thread so as to support power transmission through the well.

DETAILED DESCRIPTION

Embodiments are described with reference to certain tools and applications run in a well over slickline. As used herein, the term "slickline" is meant to refer to an application that is run over a conveyance line that is substantially below about 0.25 inches in overall outer diameter. That is, as opposed to a higher profile or diameter wireline cable, downhole applications detailed herein are run over a relatively more cohesive or solid state low profile or diameter slickline. Additionally, the embodiments detailed herein are described with reference to particular logging applications and tools. However, slickline embodiments detailed herein may be particularly beneficial when combined with more interventional applications such as those performed with coiled tubing. Regardless, embodiments generally employ a fiber optic electrical core that includes fiber optic thread that with electrically conductive member disposed about the core so as to render a practical and effective electrically conductive fiber optic slickline.

Figure 1:
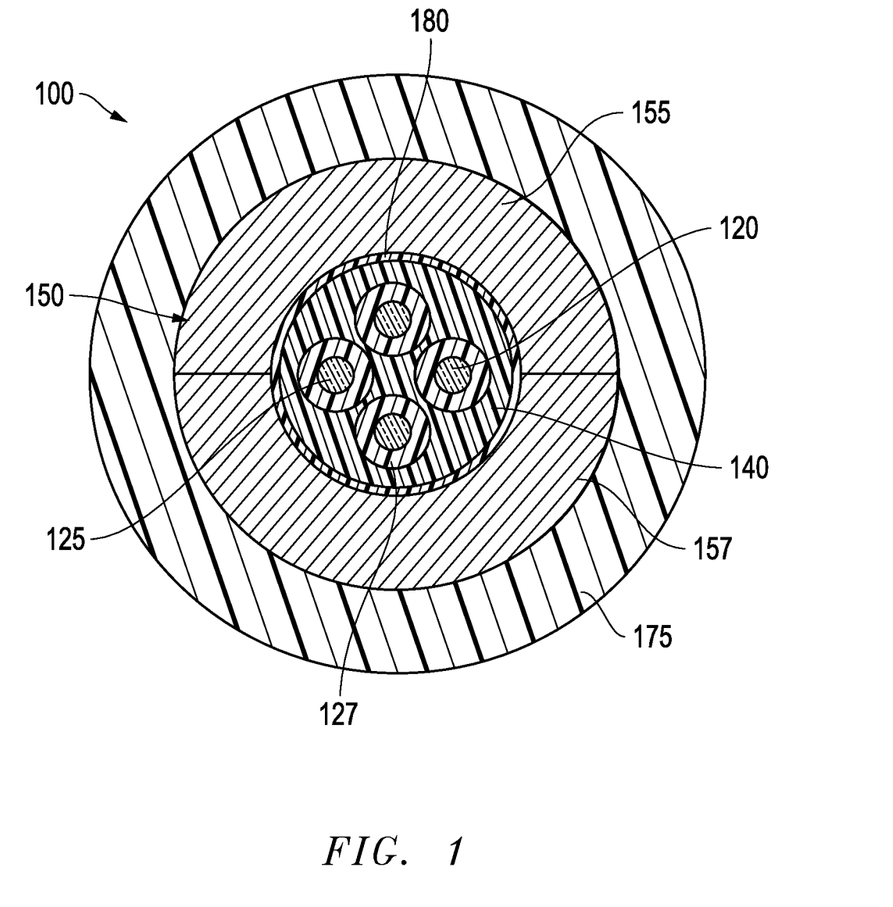
FIG. 1 is a cross-sectional view of an embodiment of a fiber optic electrical core of a fiber optic slickline.

Referring specifically now to FIG. 1, an embodiment of a fiber optic electrical core 100 is shown. This core 100 may be incorporated into a fiber optic slickline 200 as alluded to above so as to provide separately dedicated telemetric and powered capacity to the line 200 (see FIG. 2A). This is achieved by use of one or more fiber optic threads 120, 125 to provide dedicated telemetry whereas electrical power may be conveyed over a conductive member 150 about the threads 120, 125. In the embodiment shown, four separate threads or optical fibers 120, 125 are utilized which are each jacketed by a conventional polymeric buffer 127. The conductive member 150 on the other hand is provided as generally c-shaped split shell or halves 155, 157. For example, in the embodiment shown, electrically conductive copper halves 155, 157 surround the entirety of the underlying bundle of threads 120, 125. Thus, efficient use of space within the core 100 is maximized without the morphology of the member 150 providing any added void space. As a result, the overall profile of the slickline 200 may be kept below about 0.20 inches in outer diameter (see FIGS. 2A and 2B).

Continuing with reference to FIG. 1, void space is also avoided by the use of a filler matrix 140 encompassing the fiber optic threads 120, 125. For example, a silicon-based polymer may be utilized to form a cohesive unit among the threads 120, 125. With added reference to FIGS. 2A and 2B, this may be advantageous in helping the entirety of the slickline 200, including the threads 120, 125, to behave in a cohesive and unitary manner. That is, this may be desirable during a downhole application, as opposed to allowing the threads 120, 125 to respond independently of the remainder of the line 200 which may occur in the absence of a filler matrix 140.

In an alternate embodiment where cohesive responsiveness of the fiber optic threads 120, 125 is of comparatively lesser concern, the core 100 may avoid use of a filler matrix 140. Instead, the threads 120, 125 may be intentionally placed within a welded steel tube in a loose fashion with a sufficiently thick electrically insulating polymer layer 180 thereabout.

In the embodiment of FIG. 1, recognition of the electrically conductive nature of the surrounding member 150 is similarly recognized with the fiber optic bundle being encapsulated by the noted electrically insulating polymer layer 180. Similarly, the electrically conductive member 150 may also be surrounded by an insulating polymer jacket 175. Thus, a fully insulated electrical conveyance is achieved. Additionally, in one embodiment, the power conductive member 150 may also serve as a backup for data transmission. That is, in circumstances where the comparatively less robust fiber optics 120, 125 suffer micro-bends or other damage, the member 150 may be utilized as a mode of data relay between downhole tools 275 and surface equipment 225 (again see FIGS. 2A and 2B).

Figure 2A:
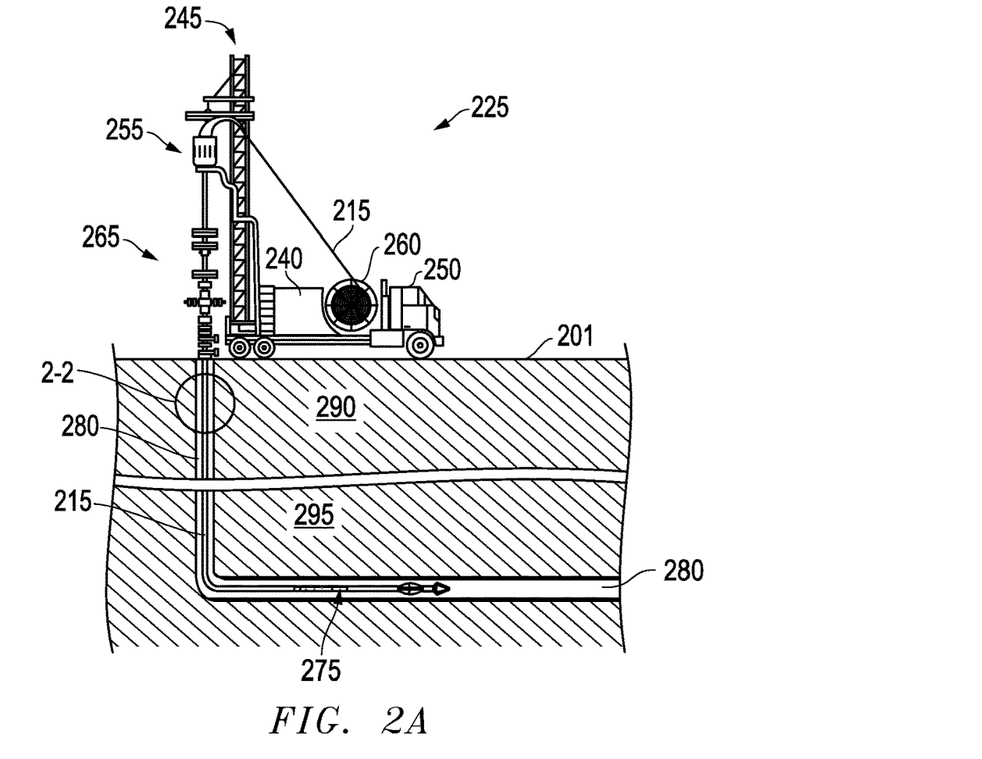
FIG. 2A is an overview of an oilfield with a well accommodating coiled tubing that utilizes slickline with the fiber optic electrical core of FIG. 1.
Figure 2B:
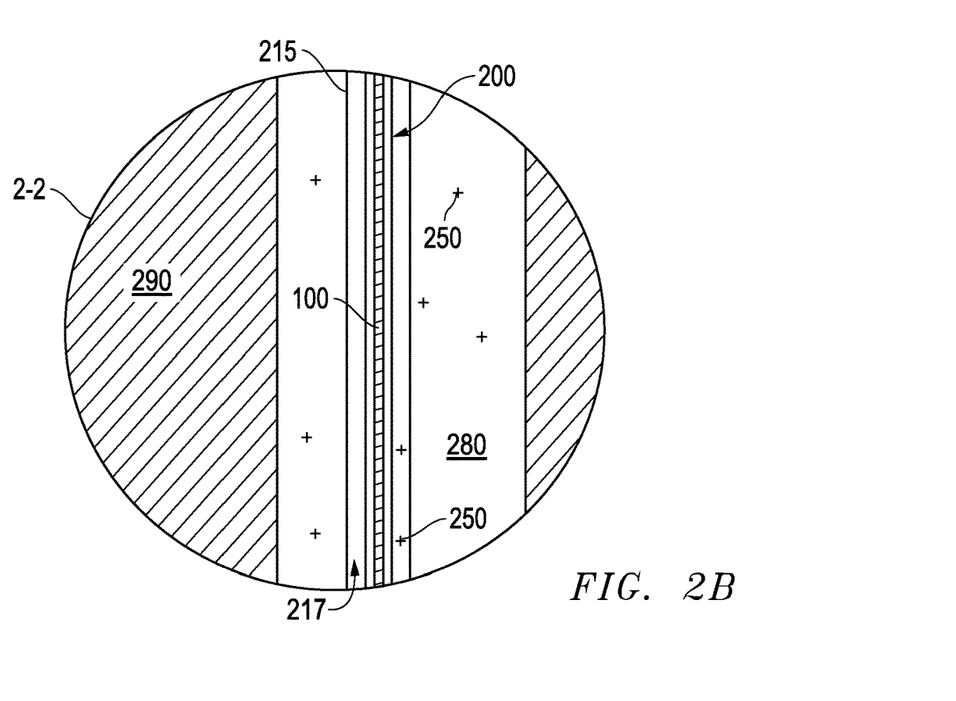
FIG. 2B is an enlarged view of the slickline in the well, taken from 2-2 of FIG. 2A.

Continuing now with reference to FIGS. 2A and 2B, overview and enlarged views of an oilfield 201 are depicted with a well 280 accommodating an embodiment of an electrically conductive fiber optic slickline 200. That is, the slickline 200 incorporates the fiber optic electrical core 100 referenced hereinabove and shown in FIG. 1.

FIG. 2A in particular, depicts a logging application at the oilfield 201 that is run through a deviated well 280 via coiled tubing 215. With added reference to FIG. 2B, the slickline 200 is disposed within an interior flow passage 217 of the coiled tubing 215. The slickline 200 is communicatively coupled to a logging tool 275. Thus, characteristics of the well 280 over various formation layers 290, 295 may be detected by way of the tool 275. Once more, the fiber optic nature of the slickline 200 allows for certain detections, such as, but not limited to, temperature, pressure, and/or vibration readings, to be taken directly with fiber optic threads 120, 125 apart from the noted tool 275 (see FIG. 1). Such temperature, pressure, and/or vibration readings may be obtained utilized distributed temperature sensing (DTS), distributed pressure sensing (DPS), distributed strain sensing (DSS) or distributed vibration sensing (DVS) utilizing the fiber optic threads 120, 125 as will be appreciated by those skilled in the art and transmitted to the surface equipment 225. Additionally, to the extent necessary, the tool 275 may be effectively powered without reliance on a downhole power source. That is, as noted above, the electrically conductive nature of the slickline 200 allows power for the tool 275 to be obtained from surface equipment 225.

In the embodiment shown, the surface equipment 225 includes a control unit 240 that may be coupled to the coiled tubing 215 and slickline 200 by way of a reel 260. Thus, as indicated, effective powering of the downhole tool 275 may be surface directed as well as the overall coiled tubing application. Additionally, data transmitted between the tool 275 and surface equipment 225 (such as the control unit 240) along the fiber optic threads 120, 125 and/or the conductive member 150 of the slickline 200 may be analyzed in real-time.

In this example embodiment, a mobile coiled tubing truck 250 is utilized for deployment of the slickline equipped coiled tubing 215 via a conventional gooseneck injector 255 with supportive rig 245. Thus, the coiled tubing 215 may be forcibly injected past pressure control equipment 265 and through the tortuous well 280 for a logging application. The depicted application may benefit from the slickline 200 having such electrically conductive, yet cohesive capacity. For example, as noted above, the slickline 200 is more cohesive than a void space metallic tube of fiber optics often used in coiled tubing operations but which is otherwise more prone to pinhole defects, rigidity, collapse and quicker erosion.

To the contrary, as shown in FIG. 2B, and detailed further in reference to FIGS. 3A and 3B below, the core 100 is embedded in a more cohesive polymer layering. This is done without the use of significant void space and while maintaining an electrically insulated member 150 within the core 100 that does not substantially add to the overall profile of the line 200 (see FIG. 1). In fact, as detailed further below, the cohesive manner of layering may allow for the inclusion of a variety of additional features. For example, with specific reference to FIG. 2B, the slickline 200 in the well 280 may be exposed to hydrogen 250. However, a cohesively layered line 200 provides a platform for the addition of features (501) that may serve as safeguards against hydrogen attack on the optical fibers 120, 125, which may cause a darkening effect on the fibers 120, 125 and/or thermal expansion (see FIGS. 5A and 5B). Thus, telemetric fiber optic capacity of the line 200 may be better protected overall.

As depicted in FIG. 2B, the slickline 200 includes a core 100 that is not limited solely to fiber optics floating within a metal tube, but is rather of a more cohesive unitary form (e.g. fiber optics 120, 125 retained by filler 140 in one embodiment described above). Thus, as indicated, conveyance via coiled tubing 215 with such an electrically conductive fiber optic slickline 200 disposed in the interior flow passage 217 thereof is less likely to subject the line 200 to pinhole defects, collapse and other failure modes during the coiled tubing application.

Figure 3A:
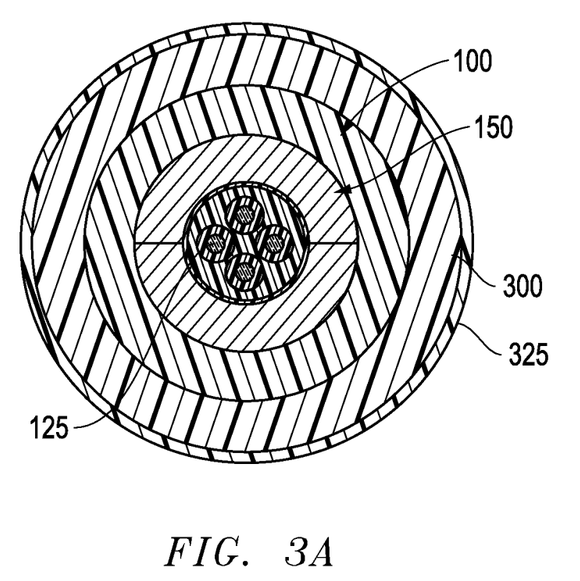
FIG. 3A is a cross-sectional view of the fiber optic electrical core of FIG. 1 with protective layering assembled thereover.
Figure 3B:
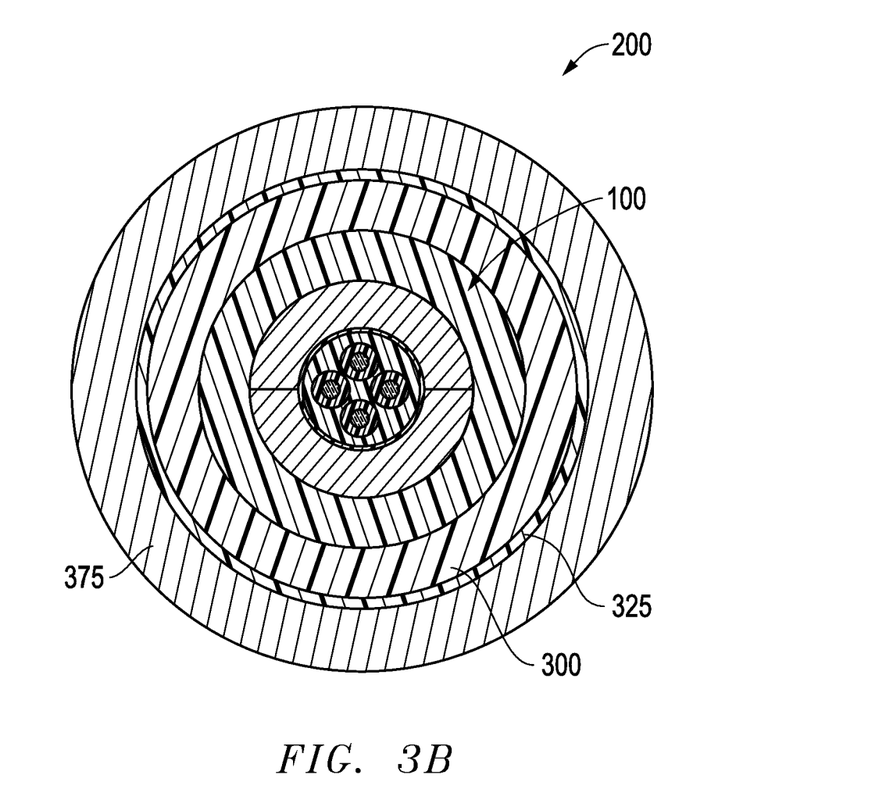
FIG. 3B is a cross-sectional view of the completed fiber optic slickline of FIGS. 2A and 2B.

Referring now to FIGS. 3A and 3B, cross sectional views of the fiber optic electrical core 100 of FIG. 1 are depicted as it is assembled into the completed fiber optic slickline 200 of FIGS. 2A and 2B. Specifically, FIG. 3A depicts the core 100 with different layers 300, 325 provided there-over, whereas FIG. 3B depicts the completed slickline 200 complete with outer cladding 375.

With specific reference to FIG. 3A, the core 100 may be surrounded by a synthetic fiber layer 300. For example, in one embodiment, this layer is a para-aramid synthetic fiber such as Kevlar® for sake of enhancing overall strength. However, carbon, epoxy glass, an aromatic polyester such as Vectran®, or a variety of other material types may be utilized depending on desired characteristics of the completed line 200.

With added reference to FIG. 3B, a comparatively thinner and lighter weight polymer layer 325 may be extruded over the underlying fiber layer 300 to serve as an adherent. That is, adherence between a subsequent cladding layer 375 and the fiber layer 300 may be enhanced by way of the intervening adherent layer 325. In the embodiment shown, the cladding layer 375 may be a conventional metal-based layer such as a steel jacket. In an embodiment, an austenitic nickel-chromium-based superalloy may be utilized such as Inconel®. Once more, the layering process may continue by way of additional cladding layers (i.e. double-cladding). This may include intervening polymer layers between cladding layers for added durability and flexibility. Regardless, the completed fiber optic slickline 200 is now of substantial crush and torque resistance in addition to maintaining a low profile or diameter and having power transmitting capacity.

Figure 4:
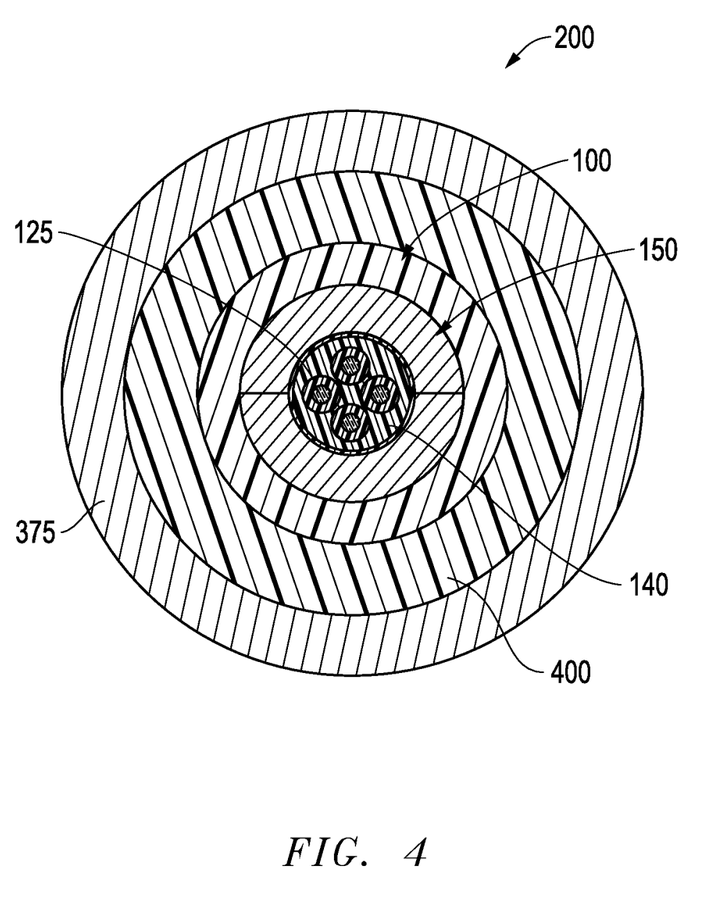
FIG. 4 is a cross-sectional view of an alternate embodiment of a fiber optic slickline utilizing the fiber optic electrical core of FIG. 1.

Referring now to FIG. 4, a cross-sectional view of an embodiment of a fiber optic slickline 200 is shown. In this embodiment, the same configuration of fiber optic electrical core 100 is utilized as that depicted in FIG. 1. However, in contrast to the type of layering depicted in FIGS. 3A and 3B, a foamed polymer 400 is utilized between the core 100 and the outer cladding layer 375. In one embodiment, a fluorinated ethylene propylene may be used. The use of a foamed polymer 400 in this manner may protect the underlying core 100 during manufacturing. For example, the foamed polymer 400 may compensate for thermal expansion differences during high temperature cladding (e.g. between the copper member 150 of the core 100 and the steel-based cladding layer 375). Similarly, the foamed polymer 400 may also absorb compressive forces during the cladding process, thereby further protecting the underlying core 100.

In an embodiment where protecting the underlying core 100 during processing is of foremost concern, a foamed polymer 400 may be utilized as detailed above, for example, as opposed to a synthetic fiber layer 300 as shown in FIGS. 3A and 3B. Of course, in other embodiments, the foamed polymer 400 may be used as well as a synthetic fiber layer 300. For example, in an embodiment, a strength enhancing Kevlar® layer 300 may be placed about the core 100 with a foamed polymer 400 thereover. In such circumstances, the degree to which either layer 300, 400 is reduced in thickness versus accepting a greater overall diameter of the slickline 200 may be a matter of preference.

Figure 5A:
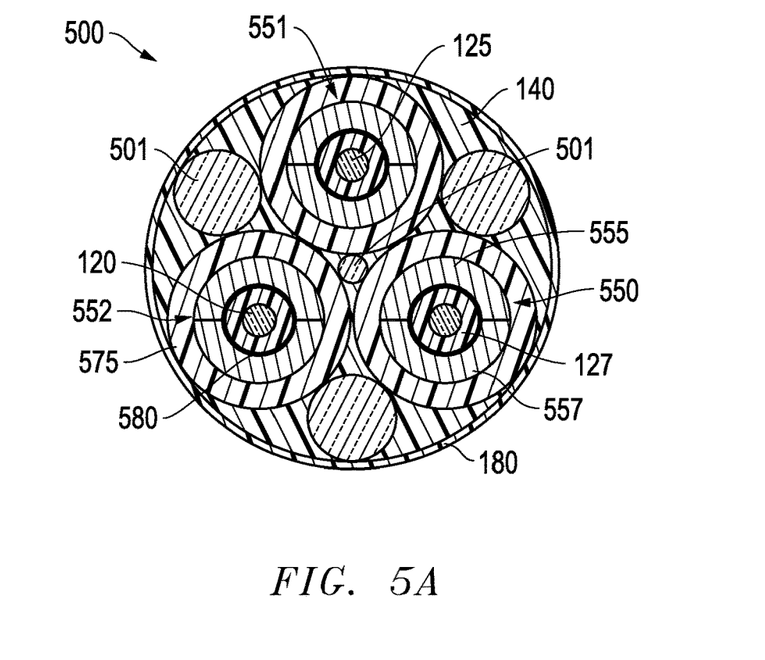
FIG. 5A is a cross-sectional view of an alternate embodiment of fiber optic electrical core of a fiber optic slickline.
Figure 5B:
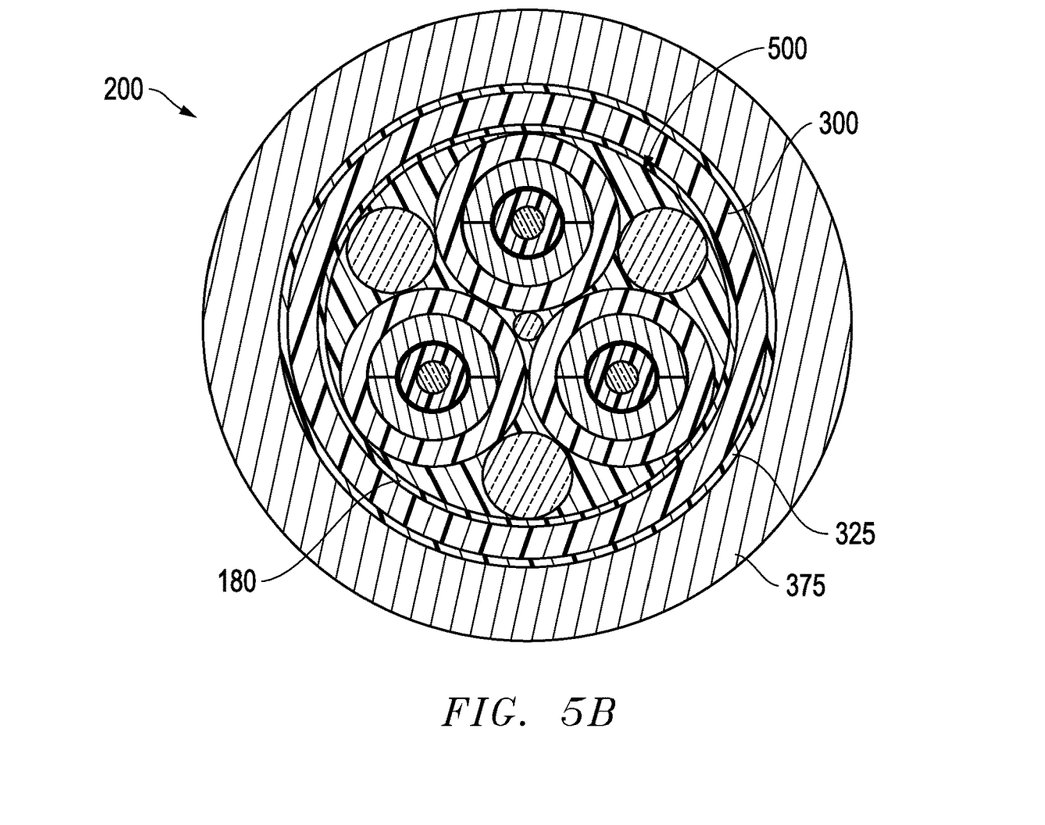
FIG. 5B is a cross-sectional view of a completed fiber optic slickline utilizing the fiber optic electrical core of FIG. 5A.

Referring now to FIGS. 5A and 5B, an embodiment of slickline 200 is depicted. In this embodiment, the underlying core 500 is of a configuration different from that depicted in FIGS. 1, 3A, 3B, and 4. Specifically, a single split shell conductive member 150 about a variety of bundled fiber optic threads 120, 125 is not utilized. Rather each thread 120, 125 is provided with its own independent conductive member 550, 551, 552 thereabout. Specifically, a thread 120, 125 may be surrounded by a polymeric buffer 127 as with the embodiment of FIG. 1. However, an individual insulating layer 580 may be provided about each buffer 127 along with each half 555, 557 of each member 550, 551, 552. Accordingly, each conductive member 550, 551, 552 may then be surrounded by an electrically insulating polymer 575.

Continuing with reference to FIG. 5A, each individual conductive member 550, 551, 552 and underlying associated thread 120, 125 group is held in place by a filler matrix 140 similar to the embodiment of FIG. 1. However, in the embodiment of FIG. 5A, the core 500 also includes glass yarn members 501. Specifically, in a triad embodiment as shown, four yarn members 501 are shown (an extra for the center of the core 500). Use of glass yarn members 501 in this manner may provide both manufacturing and application advantages. For example, added stability may be provided during assembly. This may include structural support, during cladding of the polymer layer 180 for example. Additionally, these members 501 may help compensate for thermal expansion during processing in light of the different neighboring material types. Indeed, the members 501 may be helically wound to further enhance such a thermal compensating role.

Application advantages are also provided as noted above. Specifically, glass yarn includes the inherent characteristic of hydrogen absorption. Thus, with added reference to FIG. 2B, any influx of hydrogen 250 may be largely absorbed by the members 501 so as to lessen a potentially darkening effect on the fiber optic threads 120, 125 during use of the slickline 200 in the well 280.

With specific reference now to FIG. 5B, is a cross-sectional view of the completed fiber optic slickline 200 utilizing the fiber optic electrical core 500 of FIG. 5A is shown. In this embodiment, the insulating polymer layer 180 is surrounded by a synthetic fiber layer 300, an adherent layer 325, and outer cladding 375 as detailed hereinabove. Of course, in other embodiments different types of layers or additional layers may also be utilized including foamed polymer and/or double cladding configurations.

Figure 6A:
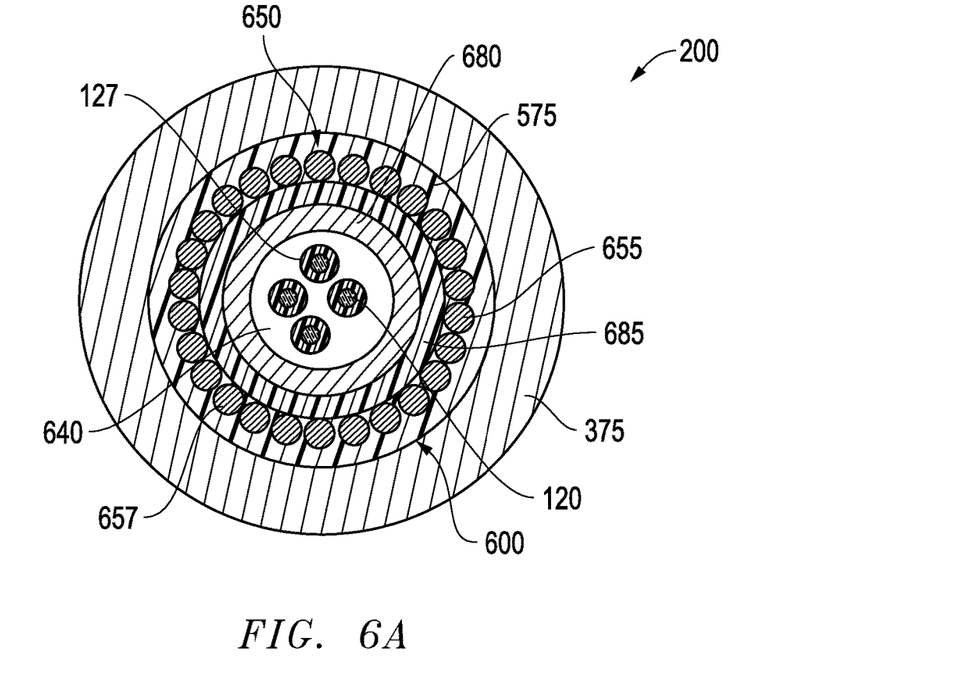
FIG. 6A is a cross-sectional view of another embodiment of an electrically conductive fiber optic slickline and core.

Referring now to FIG. 6A, a cross-sectional view of an embodiment of an electrically conductive fiber optic slickline 200 is shown. In this embodiment, the fiber optics of the core 600 are again surrounded by an electrically conductive member 650 for sake of power transmission. However, in this embodiment, the electrically conductive member is made up of a plurality of individual conductive wires 655, 657 as opposed to more unitary joining shell halves as depicted in other embodiments detailed hereinabove. This may be advantageous from a manufacturability and/or available materials standpoint. Further, the wires 655, 657 may be helically wound about the optical fibers or threads 120, a welded metal tube 680 and an insulating polymer layer 685 so as to serve a thermally compensating role as noted hereinabove (see glass yarn members 501 of FIGS. 5A and 5B).

Regardless, the wires 655, 657 are again imbedded within or surrounded by an electrically insulating polymer 575 with another insulating polymer layer 685 there-under. Thus, in the embodiment shown, where the welded metal tube 680 with void space 640 is utilized to accommodate free-floating fiber optic threads 120 and buffer 127, sufficient electrical insulation is available to the member 650. Of course, in other embodiments, the threads 120 may be disposed in a filler and/or a variety of other layering may be utilized in addition to the outer cladding 375 shown. In an embodiment, the tube 680 may be eliminated and a filler matrix 140 inserted into the space occupied by the void 640 such that the slickline 200 resembles an embodiment closer to that depicted in FIG. 1.

Figure 6B:
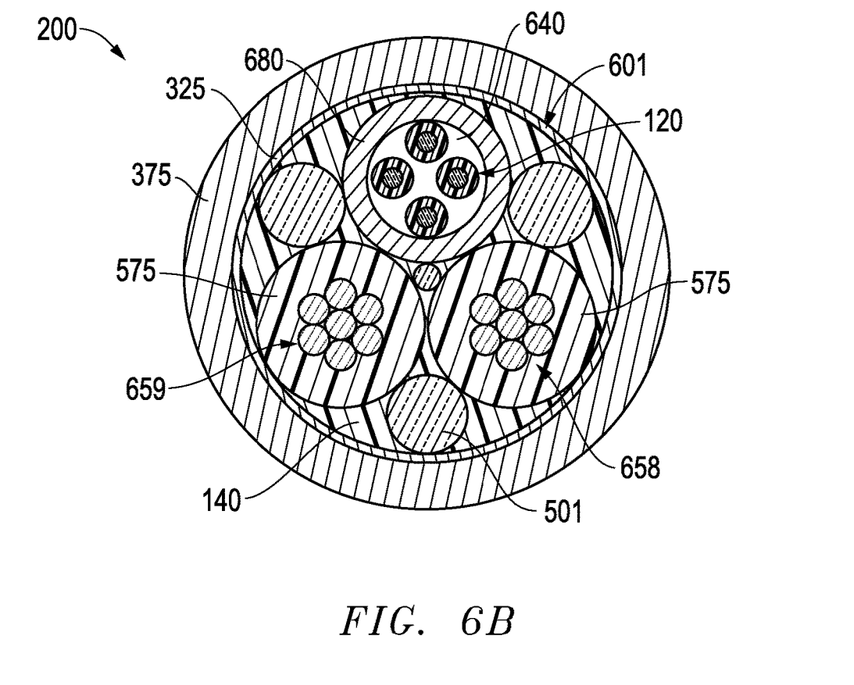
FIG. 6B is a cross-sectional view of yet another embodiment of an electrically conductive fiber optic slickline and core.

Referring now to FIG. 6B, a cross-sectional view of an embodiment of an electrically conductive fiber optic slickline 200 is shown. In this embodiment, the core 601 is made up of separately bundled optical fibers or threads 120 and electrically conductive members 658, 659. That is, as opposed to positioning the members 658, 659 circumferentially relative to the fiber optic threads 120, they are separately located adjacent the fiber optics 120. In the embodiment shown, the members 658, 659 are again of wire form disposed in electrically insulating polymer 575 and the fiber optics 120 are of individually buffered fibers located in a void space 640 of a metal tube 680. As a matter of enhancing strength and thermal compensation, each of the members 658, 659, and the tube 680 may be helically wound relative one another similar to other embodiments detailed hereinabove.

With further reference to other embodiments discussed above, a filler matrix 140 is utilized to provide a more cohesive form to the overall core 601. Indeed, in the embodiment shown, glass yarn members 501 are again also utilized within the matrix 140 as a manufacturing and/or application aid as also detailed hereinabove. Further, an adherent layer 325 and outer cladding 375 are shown. However, once again, a variety of other layering may be utilized.

Embodiments of fiber optic slickline are detailed hereinabove that include the feature of downhole power transmission over an electrically conductive member. Thus, a mode of backup telemetry to the fiber optics of the line is also provided. However, this is achieved through embodiments that strategically utilize the available space of traditionally sized slickline, that is, without substantially adding to the overall outer diameter. Thus, the advantages of utilizing slickline over much larger and more cost prohibitive wireline cabling may be retained for suitable downhole applications.

In operation, when an embodiment of the fiber optic slickline 200 disposed in the interior flow passage 217 of the coiled tubing 215 and disposed in a wellbore such as the wellbore 280 shown in FIG. 2A, as will be appreciated by those skilled in the art. The relatively small exterior or outer diameter of the fiber optic slickline 200 below 0.20 inches in outer diameter) compared to the interior flow passage 217 of the coiled tubing 215 (the outer diameter of which is typically between about 2 and ⅛ inches (about 53.9 mm) to about 3 and ¾ inches (about 95.3 mm)), which advantageously does not substantially reduce the amount of internal area or volume within the interior flow passage 217 for performing wellbore operations requiring fluid flow through the interior flow passage 217. The wellbore operation may comprise a coiled tubing operation including, but not limited to, a fluid pumping operation, a fracturing operation, an acidizing operation, and/or a drilling operation. The robustness of the fiber optic slickline 200 allows the slickline 200 to provide telemetry and/or power at an extensive range of fluid flow rates during wellbore operations (such as including flow rates up to those flow rates typically seen in hydraulic fracturing operations and the like, as will be appreciated by those skilled in the art) and fluid types (including viscous fluids such as gels and the like) while maintaining its structural integrity. The fiber optic slickline 200 and/or the coiled tubing 215 may be attached to a wellbore device or tool such as a downhole coiled tubing tool 275 or the like, as shown in FIG. 2A. In a non-limiting example, the wellbore device or tool may comprise a measurement device to measure a property and generate an output and an interface device to convert the output from the measurement device to an optical or electrical signal. The property may be any property that can be measured in a borehole such as, but not limited to, pressure, temperature, distributed temperature, pH, amount of precipitate, fluid temperature, depth, chemical luminescence, gamma-ray, resistivity, salinity, fluid flow, fluid compressibility, viscosity, compression, stress, strain, tool location, tool state, tool orientation, and combinations thereof. In some embodiments, the apparatus of the invention may comprise a device to enter a predetermined branch of a multi-lateral well. In particular embodiments, the wellbore may be a multilateral well and the measured property be a tool orientation or a tool position. Types of wellbore devices may comprise a camera, a caliper, a feeler, a casing collar locator, a sensor, a temperature sensor, a chemical sensor, a pressure sensor, a proximity sensor, a resistivity sensor, an electrical sensor, an actuator, an optically activated tool, a chemical analyzer, a flow-measuring device, a valve actuator, a firing head actuator, a tool actuator, a reversing valve, a check valve, and a fluid analyzer. The wellbore device may be provided power and telemetry by the fiber optic slickline 200 or other embodiments thereof disclosed hereinabove. A variety of wellbore operations may be performed, such as matrix stimulation, fill cleanout, fracturing, scale removal, zonal isolation, perforation, downhole flow control, downhole completion manipulation, well logging, fishing, drilling, milling, tractoring, measuring a physical property, locating a piece of equipment in the well, locating a particular feature in a wellbore, controlling a valve, and controlling a tool, as will be appreciated by those skilled in the art.

The fiber optic slickline 200 disposed within the coiled tubing 215 may provide telemetry and power for transmitting signals, power, or information from the wellbore to the surface or from the surface to the wellbore for a number of downhole operations and/or tools disposed in the wellbore on the coiled tubing, as will be appreciated by those skilled in the art. The fiber optic slickline 200 disposed within the coiled tubing 215 may be configured to obtain DTS, DPS, DSS, and/or DVS measurements utilizing the fiber optic threads 120, 125 as will be appreciated by those skilled in the art. In an embodiment, the fiber optic slickline 200 may be disposed directly into the wellbore 280 without the use of coiled tubing and may be configured to obtain DTS, DPS, DSS, and/or DVS measurements utilizing the fiber optic threads 120, 125 as will be appreciated by those skilled in the art.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Regardless, the foregoing description should not be read as pertaining only to the precise structures described and shown in the accompanying drawings, but rather should be read as consistent with and as support for the following claims, which are to have their fullest and fairest scope.

We claim:

1. A method of performing a wellbore operation in a well, the method comprising:
   providing a coiled tubing;
   running an electrically conductive fiber optic cable through an interior flow passage of the coiled tubing;
   flowing fluid through the interior flow passage of the coiled tubing to perform the wellbore operation;
   communicating through the well over a plurality of fiber optic threads located in a void space defined by a metal tube of a core of the electrically conductive fiber optic cable, wherein the core is surrounded by an outer metallic cladding layer of the electrically conductive fiber optic cable, wherein the outer metallic cladding layer provides crush and torque resistance for the cable; and
   transmitting one of power and backup communications through the well over a plurality of electrically conductive wires helically wound circumferentially about the metal tube, wherein the plurality of electrically conductive wires are imbedded within or surrounded by an electrically insulating polymer that is surrounded by the outer metallic cladding layer, wherein the electrically conductive fiber optic cable does not substantially reduce an amount of internal area or volume within the interior flow passage during the wellbore operation.

2. The method of claim 1 wherein the plurality of fiber optic threads are disposed in a bundle.

3. The method of claim 1 wherein the outer metallic cladding layer comprises an austenitic nickel-chromium-based superalloy.

4. The method of claim 1 wherein performing comprises performing at least one of a coiled tubing operation, a fluid pumping operation, a fracturing operation, an acidizing operation, a drilling operation, obtaining DTS measurements, obtaining DVS measurements, obtaining DSS measurements and obtaining DPS measurements and wherein communicating comprises communicating data related to the wellbore operation.

5. The method of claim 1 further comprising attaching a tool to the coiled tubing, wherein performing comprises performing the wellbore operation with the tool and wherein communicating comprising communicating data related to operation of the tool.

6. The method of claim 1 wherein performing comprises performing a fluid pumping operation, a fracturing operation, an acidizing operation, and/or a drilling operation, wherein fluid is flowed through the interior flow passage of the coiled tubing while performing the operation.

7. A downhole assembly for deployment in a well at an oilfield, the downhole assembly comprising:
   a downhole tool for performing an application in the well;
   coiled tubing running from the oilfield and coupled to the downhole tool; and
   an electrically conductive fiber optic cable coupled to the downhole tool in the well and to surface equipment at the oilfield, wherein the electrically conductive fiber optic cable is disposed within a fluid flow path of the coiled tubing, the electrically conductive fiber optic cable having a core surrounded by an outer metallic cladding layer, wherein the outer metallic cladding layer provides crush and torque resistance for the cable, the core comprising:
      a plurality of fiber optic threads disposed in a void space defined by a metal tube of the core, wherein the plurality of fiber optic threads are configured to enable communication between the downhole tool and the surface equipment; and
      a plurality of electrically conductive wires helically wound circumferentially about the metal tube, wherein the plurality of electrically conductive wires are imbedded within or surrounded by an electrically insulating polymer that is surrounded by the outer metallic cladding layer, and wherein the plurality of electrically conductive wires are configured to enable power transmission from the surface equipment to the downhole tool during the application.

8. The downhole assembly of claim 7 wherein the electrically conductive fiber optic cable does not substantially reduce an amount of internal area or volume within the fluid flow path for performing wellbore operations requiring fluid flow through the fluid flow path.

9. The downhole assembly of claim 7 wherein the plurality of fiber optic threads are disposed in a bundle.

10. The downhole assembly of claim 7 wherein the outer metallic cladding layer comprises an austenitic nickel-chromium-based superalloy.

11. The method of claim 1 wherein the electrically conductive fiber optic cable comprises an insulating polymer layer disposed between the metal tube and the plurality of electrically conductive wires.

12. The downhole assembly of claim 7 wherein the electrically conductive fiber optic cable comprises an insulating polymer layer disposed between the metal tube and the plurality of electrically conductive wires.

13. The method of claim 1 wherein each fiber optic thread of the plurality of fiber optic threads is jacketed by a polymeric buffer.

14. The downhole assembly of claim 7 wherein each fiber optic thread of the plurality of fiber optic threads is jacketed by a polymeric buffer.

15. An electrically conductive fiber optic cable comprising:
   a core surrounded by an outer metallic, steel-based cladding layer, the core comprising:

a plurality of fiber optic threads disposed in a void space defined by a metal tube of the core, wherein the plurality of fiber optic threads are configured to enable communication between a downhole tool and surface equipment during operation of the electrically conductive fiber optic cable; and a plurality of electrically conductive wires helically wound circumferentially about the metal tube, wherein the plurality of electrically conductive wires are imbedded within or surrounded by an electrically insulating polymer that is surrounded by the outer metallic cladding layer, wherein the outer metallic cladding layer provides crush and torque resistance for the cable, and wherein the plurality of electrically conductive wires are configured to enable power transmission from the surface equipment to the downhole tool during operation of the electrically conductive fiber optic cable.

16. The electrically conductive fiber optic cable of claim 15 wherein the plurality of fiber optic threads are disposed in a bundle.

17. The electrically conductive fiber optic cable of claim 15 wherein the outer metallic cladding layer comprises an austenitic nickel-chromium-based superalloy.

18. The electrically conductive fiber optic cable of claim 15 comprising an insulating polymer layer disposed between the metal tube and the plurality of electrically conductive wires.

19. The electrically conductive fiber optic cable of claim 15 wherein each fiber optic thread of the plurality of fiber optic threads is jacketed by a polymeric buffer.

* * * * *

UNITED STATES PATENT AND TRADEMARK OFFICE
CERTIFICATE OF CORRECTION

PATENT NO. : 11,268,329 B2
APPLICATION NO. : 14/917630
DATED : March 8, 2022
INVENTOR(S) : Joseph Varkey et al.

It is certified that error appears in the above-identified patent and that said Letters Patent is hereby corrected as shown below:

On the Title Page

Item (72) Replace "Burcu Unai Altintas" with --Burcu Unal Altintas--

Signed and Sealed this
Fourteenth Day of March, 2023

Katherine Kelly Vidal
*Director of the United States Patent and Trademark Office*